US012293511B2

United States Patent
Cabañas Contreras et al.

(10) Patent No.: US 12,293,511 B2
(45) Date of Patent: May 6, 2025

(54) ANOMALY DETECTION SYSTEM IN THE AUTOMATIC PLACEMENT OF COMPOSITES DURING THE MANUFACTURING OF STRUCTURAL ELEMENTS

(71) Applicant: Airbus Operations S.L.U., Getafe (ES)

(72) Inventors: Raúl Alberto Cabañas Contreras, Getafe (ES); Maria Perez Pintado, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 83 days.

(21) Appl. No.: 18/341,547

(22) Filed: Jun. 26, 2023

(65) Prior Publication Data
US 2023/0419477 A1   Dec. 28, 2023

(30) Foreign Application Priority Data
Jun. 27, 2022   (ES) ................................ ES202230572

(51) Int. Cl.
| | | |
|---|---|---|
| *H04N 7/18* | (2006.01) | |
| *G06T 7/00* | (2017.01) | |
| *G06V 10/20* | (2022.01) | |
| *G06V 10/764* | (2022.01) | |
| *G06V 20/50* | (2022.01) | |
| *G06V 20/70* | (2022.01) | |
| *H04N 23/50* | (2023.01) | |
| *H04N 23/695* | (2023.01) | |

(52) U.S. Cl.
CPC .............. *G06T 7/001* (2013.01); *G06V 10/20* (2022.01); *G06V 10/764* (2022.01); *G06V 20/50* (2022.01); *G06V 20/70* (2022.01); *H04N 23/50* (2023.01); *H04N 23/695* (2023.01); *G06T 2207/20081* (2013.01); *G06T 2207/30108* (2013.01)

(58) Field of Classification Search
CPC .......... G06T 7/001; G06T 2207/20081; G06T 2207/30108; H04N 23/695; H04N 23/50; H04N 7/18; G06V 20/70; G06V 10/20; G06V 20/50; G06V 10/764
USPC ........................................................ 348/92
See application file for complete search history.

(56) References Cited

U.S. PATENT DOCUMENTS

| | | | |
|---|---|---|---|
| 7,474,799 B2 * | 1/2009 | Bassi ........................ | G06T 5/80 |
| | | | 358/463 |
| 7,513,964 B2 * | 4/2009 | Ritter .................... | G06T 7/0004 |
| | | | 250/341.8 |

(Continued)

*Primary Examiner* — Trang U Tran
(74) *Attorney, Agent, or Firm* — Greer, Burns & Crain, Ltd.

(57) ABSTRACT

A system for inspecting structural elements during their manufacturing capable of detecting anomalies in the automatic placement of composite materials through computer vision, comprising an image capture module that can be integrated into an ATL machine extracting data from the images, from which an artificial vision module obtains information on the anomalies detected with computer vision, information that a human-machine interface module automatically translates into a language understandable to humans. By avoiding the need to manually enter data for the inspection, human errors are avoided, and the information obtained for each inspection can be automatically saved for record storage. The system is designed to inspect large structural element compounds, such as aircraft wings.

12 Claims, 5 Drawing Sheets

(56) References Cited

U.S. PATENT DOCUMENTS

| | | | | |
|---|---|---|---|---|
| 8,668,793 B2* | 3/2014 | Engelbart | ............... | B29C 70/32 |
| | | | | 156/379 |
| 9,595,096 B2* | 3/2017 | Dorris | .................. | G06T 7/0008 |
| 10,769,483 B2* | 9/2020 | Nirenberg | .............. | G06N 3/049 |
| 11,024,020 B2* | 6/2021 | de Bonfim Gripp | .. | G06V 10/82 |
| 11,094,055 B2* | 8/2021 | Nefian | .................. | G06T 7/0012 |
| 11,455,714 B2* | 9/2022 | Mok | ...................... | G06Q 50/04 |
| 2018/0311914 A1 | 11/2018 | Marcoe et al. | | |

\* cited by examiner

ANOMALY DETECTION SYSTEM IN THE AUTOMATIC PLACEMENT OF COMPOSITES DURING THE MANUFACTURING OF STRUCTURAL ELEMENTS

CROSS-REFERENCES TO RELATED APPLICATIONS

This application claims the benefit of the Spanish patent application No. P202230572 filed on Jun. 27, 2022, the entire disclosures of which are incorporated herein by way of reference.

FIELD OF THE INVENTION

The present invention falls within the technical field of artificial vision systems, also known as computer vision (computer vision: CV) and, more specifically, applied to the visual inspection of machines for the automatic placement of composites or composite resin materials (ATL machines or automated tape lying machines) that are used in the manufacturing and coating of aircraft structures.

Particularly, the present invention refers to a CV-based system for detecting anomalies in the automatic placement of composite materials (composites) during the manufacturing of structural parts (for example, fuselage parts).

BACKGROUND OF THE INVENTION

ATL (Automatic Tape Laying-up) technology is known, among its many applications, for the manufacturing of the main components of an aircraft wing.

Nowadays, the quality inspection of ATL machines, such as that used in the aeronautical industry, is carried out by means of a visual inspection by an operator, through the cameras installed on the machine, without more automatic help tools than perhaps a laser pointer to check piecewise the layers placed by the machine and check "manually" that they conform to the correct patterns, according to the standards specified for the elements related to security (SARI: Safety Related Item).

This solution is susceptible to human error, since in many cases it is quite difficult to detect defects; for example, failures in the positioning of the patterns or strips ("courses") of composite materials such as fiberglass (GF: Glass Fiber) or sheets of expanded copper (ECF: Expanded Copper Foil), due to the absence of material or deviation in its placement, causing quality leaks during the technical inspection of the fuselage panels of the wings of an aircraft. Besides, according to such current way of proceeding, an automatic record of data associated with the inspections carried out is not kept.

Another existing solution is that of non-destructive testing (NDT) systems designed for inspections, especially in the aeronautical and aerospace industry, of metal fuselage or composite components used in aircraft bodies, rudders, etc., and locating defects such as cracks, structural failures, water inclusions, etc., quickly and easily, for example, using ultrasound techniques. NDT systems are applied in the final assembly line, so that the localized defects are already placed on the structure or already cured part, and this implies high repair costs.

Therefore, an objective technical problem that arises is to provide a computerized inspection system aimed at detecting anomalies or deviations in the automatic placement of composite layers (composite materials) during the part manufacturing phase (for example, for the fuselage of an aircraft) and thus avoid later repairs when the piece is already cured.

SUMMARY OF THE INVENTION

The present invention serves to solve the problem mentioned above, by providing a system based on artificial vision, which can be integrated into ATL machines for automatic placement of composite material, to detect anomalies, from shortages or excess of composite material to placement errors in one or more layers of composite material, during the manufacturing phase of a part or structural element, using Artificial Intelligence (AI) algorithms to analyze the images captured by one or more cameras installed in the head of the ATL machine.

One aspect of the invention refers to a system for detecting anomalies in the automatic placement of composite materials (composites) during the manufacturing of structural elements, for which the system comprises:

- an image capture module that can be integrated into an ATL machine and comprising at least one camera for capturing images of a surface to be inspected during the manufacturing of a structural element comprising the surface, where the image capture module is configured to extract data from the captured images;
- an artificial vision module configured to receive the data extracted by the image capture module and to obtain information on anomalies detected on the surface, by means of a CV (computer vision) algorithm that uses the data previously extracted from the images; and
- a human-machine interface module through which a user/operator receives the information obtained by the artificial vision module on the anomalies detected, automatically translating the information received into a human understandable language.

The advantages of the present invention compared to the prior state of the art are fundamentally that:

The system is designed to inspect compounds of large structural elements where several images may be necessary to cover the entire surface to be inspected.

By avoiding the need to manually enter data for the inspection, human errors that can lead to incorrect results are avoided.

The system makes it possible to obtain adequate data in terms of positioning tolerance of the composite materials during the manufacturing of the element with the materials and, therefore, to be able to apply a comparison algorithm with the reference or learned positions, without having to use positioning correction algorithms, thus saving software and calculation time. For example, one of the main problems that the image capture module solves is to allow working with different compounds and to deal with a positioning tolerance of the materials mold that can be up to a range of 20 millimeters in the X and e axes and on which the material placement head of an ATL machine moves.

It makes it possible to automatically record, in storage media controlled by the proposed intelligent system, each and every one of the results obtained in the inspection during the manufacturing phase.

The modularity of the system allows carrying out different implementations of each module adapted to the specific use case for which the ATL operates, performing the automatic placement of composites, offering customizable functional units for operators and adjusted to the quality requirements required for the manufacturing of certain structural elements.

These and other advantages can be derived in light of the detailed description of the invention that follows.

BRIEF DESCRIPTION OF THE DRAWINGS

To complement the description being made and in order to help a better understanding of the characteristics of the invention, according to a preferred example of its practical embodiment, a set of drawings is attached as an integral part of the description where, with an illustrative and non-limiting nature, the following has been represented.

DETAILED DESCRIPTION OF THE PREFERRED EMBODIMENTS

A detailed explanation of a preferred embodiment of an object of the present invention is provided below, with the help of the aforementioned figures.

Figure 1:
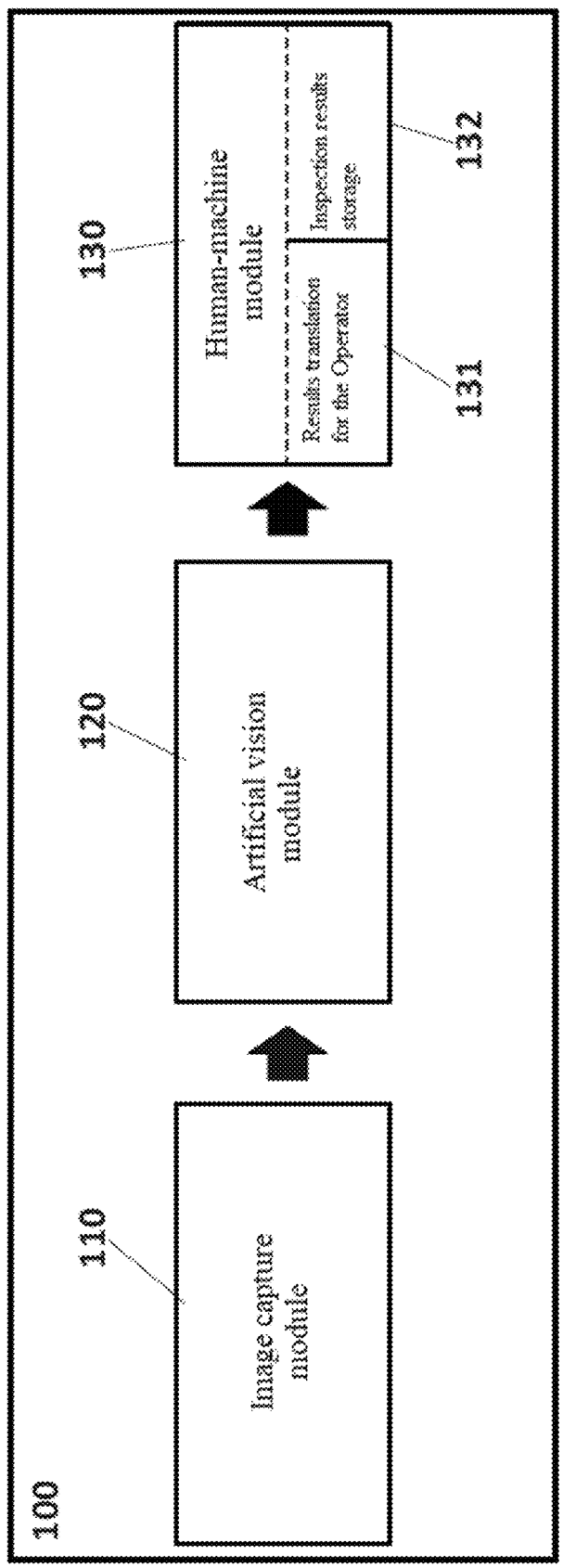
FIG. 1 shows a block diagram of the modular architecture presenting the anomaly detection system in the automatic placement of composite materials, according to a preferred embodiment of the invention.

FIG. 1 shows the main modules/components that integrate the anomaly detection system 100 based on artificial vision that is proposed to be used in the manufacturing of structural elements with ATL machines or automatic placement of composite materials/composites. These functional modules are:

Image capture module 110
Artificial vision module 120
Human-machine interface module 130

In the last human-machine interface module 130, in turn, there is a submodule for translating 131 the results surging from the artificial vision module 120 and a storage submodule 132 of the results to keep track of the resulting data in each automatic inspection executed by the system 100.

Figure 2:
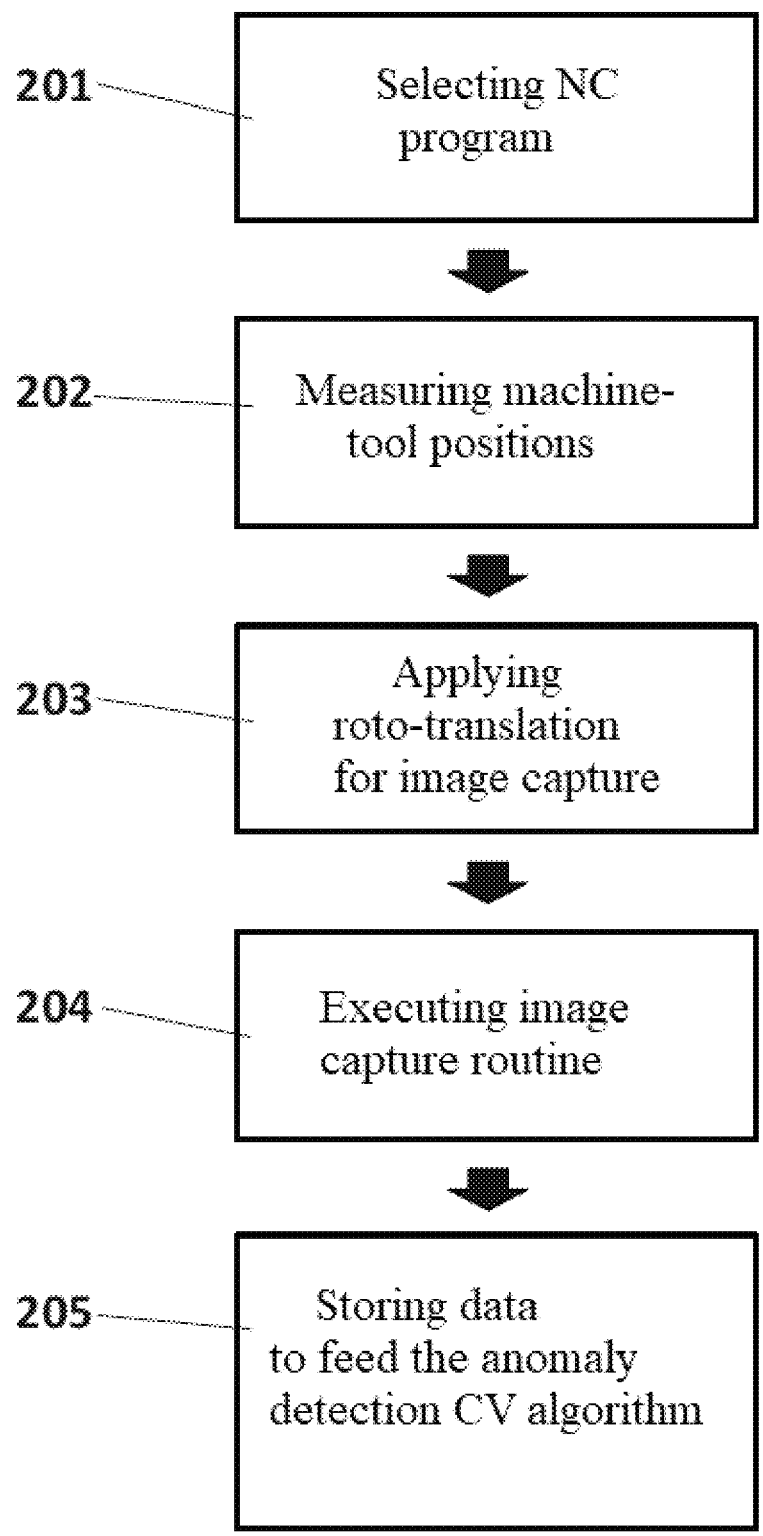
FIG. 2 shows a block diagram of the steps implemented in the image capture module of the system, according to a possible embodiment of the invention.

FIG. 2 shows in a block diagram the main steps, described in detail below, performed by the image capture module 110, which is a module that can be integrated into the industrial environment of the ATL machine and whose purpose is to obtain information based on images of the surface to be inspected on which the ATL machine operates. The image capture module 110 comprises a hardware part that includes at least one camera 312 connected to a telecommunications network to send the images to an execution control unit of the ATL machine, from which it can also receive control information via network. In addition, the image capture module 110 has a software part implemented in the execution control unit, with information processing and storage capacity, to deliver the appropriate information extracted from the images captured by the camera 312 to the next module, the artificial vision module 120, where the anomaly detection algorithm is executed, based on computer vision (CV), of the composite materials in a structural element surface being inspected.

Figure 3:
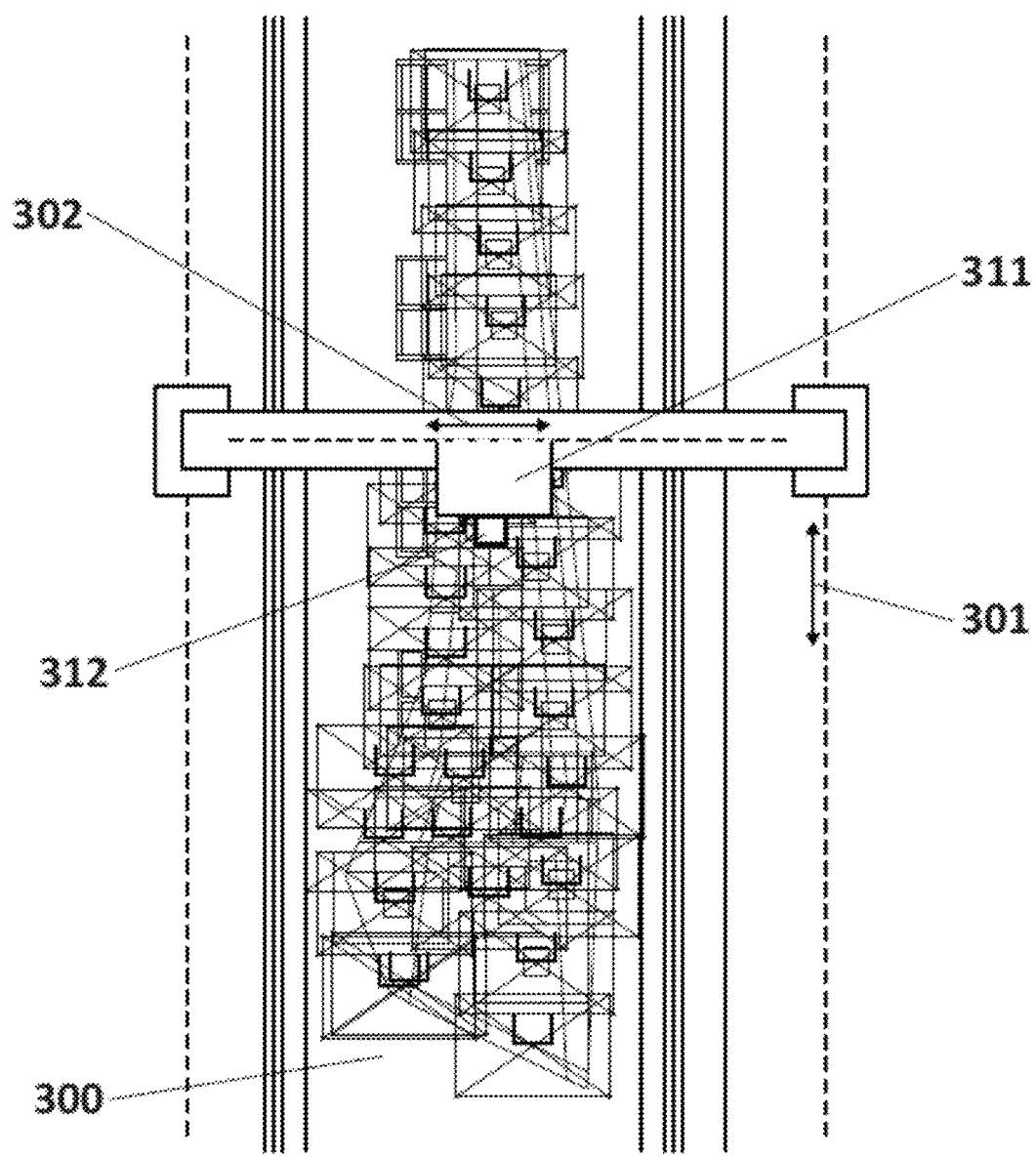
FIG. 3 shows a schematic view from above of the displacement rails of the head of an ATL machine for the automatic placement of composite materials, from which an artificial vision camera captures the images of the surface to be inspected, according to a possible embodiment of the invention.

As shown in FIG. 3, the camera 312 which will capture the images of the surface 300 to be inspected is preferably installed in a moving part of the ATL machine for the automatic placement of composite materials. More particularly, the selected moving part of the ATL machine is the automatic material placement head 311, which is capable of moving at least along two axes orthogonal to one another, an X axis 301 and a Y axis 302, along a defined plane (located) above the surface 300 to cover it entirely during the inspection in the middle of the manufacturing phase of the element. Typically, the surface 300 is flat or moderately curved; for example, it can be a structural part for composite material fuselages comprising one or more layers of fiberglass or ECF composite material. Thus, the displacement plane of the moving part where the camera 312 is located is normally defined above the surface 300, since in many cases it is not flat.

Returning to FIG. 2, the image capture module 110 implements the following steps, according to one possible embodiment:

Obtain 201, from the execution control unit of the ATL machine, the selection of the computer program executed by the numerical control system or NC (Numeric Control) controlling the movements of the working tool, the ATL machine, in relation to the coordinate axes of the machine, during the manufacturing of a part on the surface 300 to be inspected. One of the main problems to be solved by the image capture module 110 is the ability to work with different products (materials) and to deal with the positioning tolerance of the products mold. Product detection is performed by selecting an NC program designed for the mold at the material placement station.

Measure 202, by the ATL machine execution control unit, once the NC program has been selected, the positions of the tool on the coordinate axes along which it moves. For example, the position that locates the part on the surface 300 to be inspected on which the ATL machine is working, is detected by measuring three points located at the corners of the tool (i.e., the head 311 of the ATL machine): the position of a first point with determined coordinates (X1, Y1, Z1), the position of a second point with given coordinates (X2, Y2, Z2) and the position of a third point with given coordinates (X3, Y3, Z3). This step of measuring 202 such points allows for calibration of the relative position of the camera 312 with respect to the mold/support, since the molds may be positioned slightly differently from each other for the manufacturing of successive parts. In fact, in certain manufacturing methods, the mold accompanies its supported piece from one manufacturing station to another, so every manufacturing station receives successively different molds/supports.

Apply 203 a mathematical transformation of roto-translation to the measured theoretical positions, a calculation that is also carried out by the execution control unit of the ATL machine and applied in the image capture program that controls the camera 312. The roto-translation applied to the image-taking program allows it to adapt to the way in which the tool has entered the station for placement materials, and ensure repeatability in the image-taking between pieces.

Run or execute 204 such image capture program or routine, which, for example, can implement a sub-routine to capture images in response to some head movements of the operator supervising the ATL machine, so that the camera 312 carries out the acquisition of images (photos, videos or video frames) and from which the program extracts the data that will serve as input to the artificial vision module 120.

Save or store 205, in the control unit, the data extracted from the images acquired by the camera 312 to feed the artificial vision module input 120 which, in turn, executes the steps shown in FIG. 4 described below.

Figure 4:
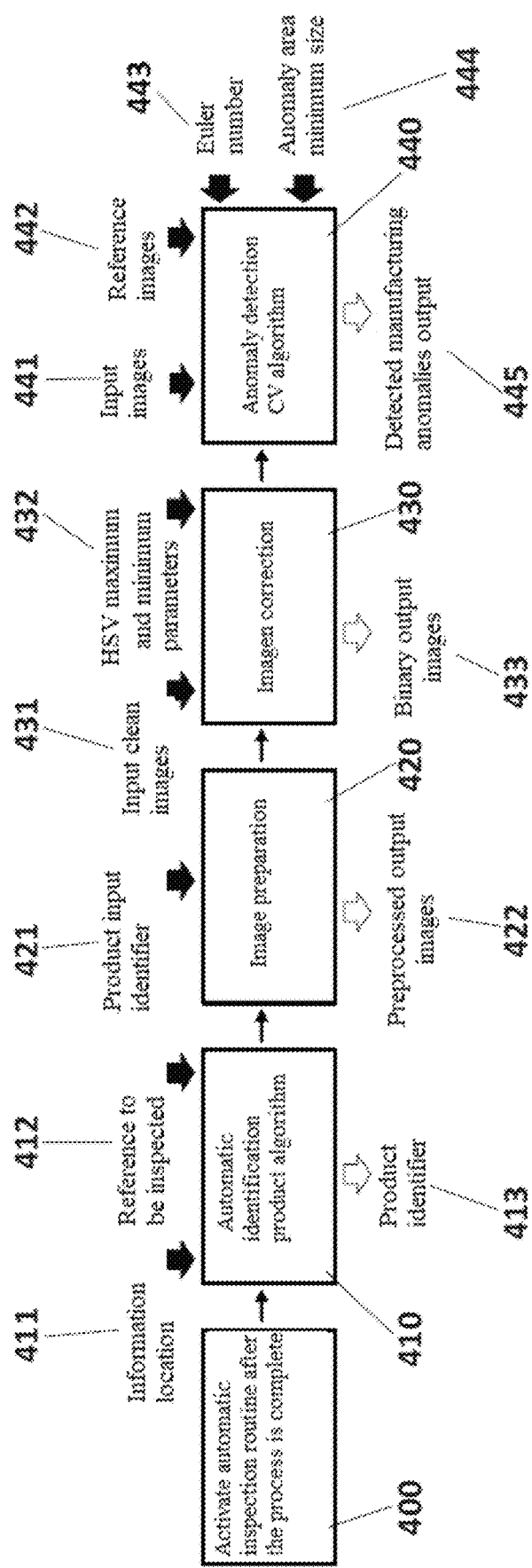
FIG. 4 shows a block diagram of the steps implemented in the artificial vision module of the system, according to a possible embodiment of the invention.

FIG. 4 shows the chain of steps implemented by the artificial vision module 120, which is the core of the system 100, as well as the inputs and outputs of each step represented by the thick arrows, according to a possible embodiment. The automatic inspection routine is run or activated 400 after finishing the process of automatic placement of composite materials carried out by the ATL machine in the surface 300 of the structural element that is being manufactured, that is to say, while still in the phase of manufacturing the element. With such activation and the information based on the captured images delivered by the previous image capture module 110, a first step is to automatically identify 410 the product or composite material to be inspected based on two input parameters: the location 411 of the information (that is created in a structured way; for example, location of a folder with image files) that is held on the structural elements for which the ATL machine is configured, and the reference or identity 412 of the physical object under inspection, for example, a certain aircraft. Therefore, the artificial vision module 120 automatically detects which product is to be inspected and delivers a product identifier 413 at its output; for example, it identifies that it is the right or left wing of a certain aircraft model. This automatic detection or identification 410 of the target of interest is performed by a classification machine-learning algorithm and avoids the manual input, which can lead to erroneous results, of the starting inspection information. The output identifier 413 of the automatic identification step 410 is entered as an input parameter 421 to the next image preparation or preprocessing step 420, comprising cleaning and cutting the images delivered by the image capture module 110 to leave them adequately prepared for the following mask employing image correction step 430. Since the CV or computer vision algorithm 440 for anomaly detection using the artificial vision module 120 is based on image comparison, it is necessary to previously remove all sections of the images that are outside the item being manufactured (that is, for example, tools, parts of the ground, parts of the manufacturing machine, . . . and any other object "getting" into the image acquired by the image capture module 110) and that could give rise to false anomalies. This preparation or preprocessing of the images 420 is previously defined for each product to be inspected and applied, therefore, according to the identification of the product that has been obtained from the previous identification step 410. Additionally, for example, for the manufacturing of large parts, where lighting conditions might change along the surface 300 to be inspected, this preprocessing of the images 420 may also comprise color corrections. The output preprocessed images 422 are fed as input images 431, already cleaned and cut, to the sub-module or image correction step 430 by means of masks, together with input values referring to maximum and minimum values 432 of hue, saturation and brightness or value (HSV model: Hue, Saturation, Value) that define a color model in terms of those three components. The purpose of this image correction 430 by color mask thresholds is to convert an RGB image to a binary image highlighting only the composite material to be inspected based on its color properties (for example, a gray material is highlighted against the green one) and thus filtering the information of each pixel according to the threshold, maximum and minimum values 432 of a given hue, saturation and brightness, which are configured according to the material and lighting conditions of the automatic inspection. Additionally, after applying these masks or thresholds, some binary operations (such as binary dilation and binary closure) can be applied to remove or reduce noise from small black pixels. The output binary images 433 of the image correction 430 are passed as input images 441 to the computer vision algorithm 440 for anomaly detection, which performs a comparison of the images, corrected and converted into binary corresponding to the surface 300 to be inspected, with reference images 442 that are theoretically correct images (without anomalies). The reference images 442 can be obtained in various ways: for example, by conversion of a computerized model of the part to be obtained, or by learning, based on images captured in pieces previously verified by trained humans as images without anomalies (other ways of obtaining such reference images 442 can be used). Based on the result of this image comparison, some binary operations are applied again to reduce noise, and also the computer vision algorithm 440 performs the following steps: a) the first step is to detect all areas that are identified as anomalies using an algorithm labeling that identifies connected areas or cluster areas and calculates properties related to these clusters; b) the next step is to discriminate between real patterns of absence of material and noise, or discriminate lighting points (such lighting spots being a common problem in computer vision processes that can be solved through hardware components, but the present solution is based on software) using a new feature or parameter ("porosity parameter") that is calculated from the area value of the cluster and the Euler number 443 (the Euler number is defined as a mathematical operation including the number of holes within a cluster or group of connected areas). By evaluating two conditions, the minimum size 444 of areas to be inspected and the "porosity parameter", the computer vision algorithm 440 is able to discriminate between noise and missing material and thus reducing, using only software, the rate of false positives in CV abnormality (anomaly) detection. This double condition makes it possible to compare the detected anomaly size against the minimum size to be detected while checking the porosity condition of the anomaly area; so that if the porosity exceeds a certain level, it is discarded (ruled out) as a standard. The porosity parameter is therefore a new parameter specifically defined to be able to distinguish noise (mainly coming from reflections on the material) from anomalies due to lack or pattern deviation. The information on detected anomalies, which may be related to lack/excess of material or misplaced material, is delivered to the output 445 as detected manufacturing anomalies and are the results input to the human-machine interface module 130, being the information able to be delivered based on color properties. The objective is to be able to detect, apart from lack or excess of material, not only a bad positioning due to the fact that the material is not where it should be, but it is also possible to detect a bad positioning of the material; i.e., that a wrinkle or foreign material on the surface can also be detected as an anomaly based on size and color contrast.

Finally, the system 100 delivers through its human-machine interface module 130 the results of the anomaly detection algorithm obtained at the output of the artificial vision module 120, after executing the steps seen above. The human-machine interface module 130 delivers (usually by visually displaying) the results to the operator who has activated the system 100 for automatic inspection while operating/supervising the ATL machine while manufacturing the structural elements; therefore, it should automatically 131 translate all output into human understandable language and, if any anomaly has been detected, display the location and type of anomaly. Among the results, it can be shown a clear indication whether there is an abnormality that needs to be carefully inspected or whether the entire surface is correct, according to theoretical or standard parameters. For example, in the translated communication to the operator of the results, the human-machine interface module 130 can use a color code to indicate the lack of material with one color or the extra material found in the inspection using a different color. In addition, a history record part or storage sub-module 132 is also included in this module, where all the outputs of the execution of the artificial vision module 120 are saved, to track the information of each automatic inspection executed.

Figure 5:
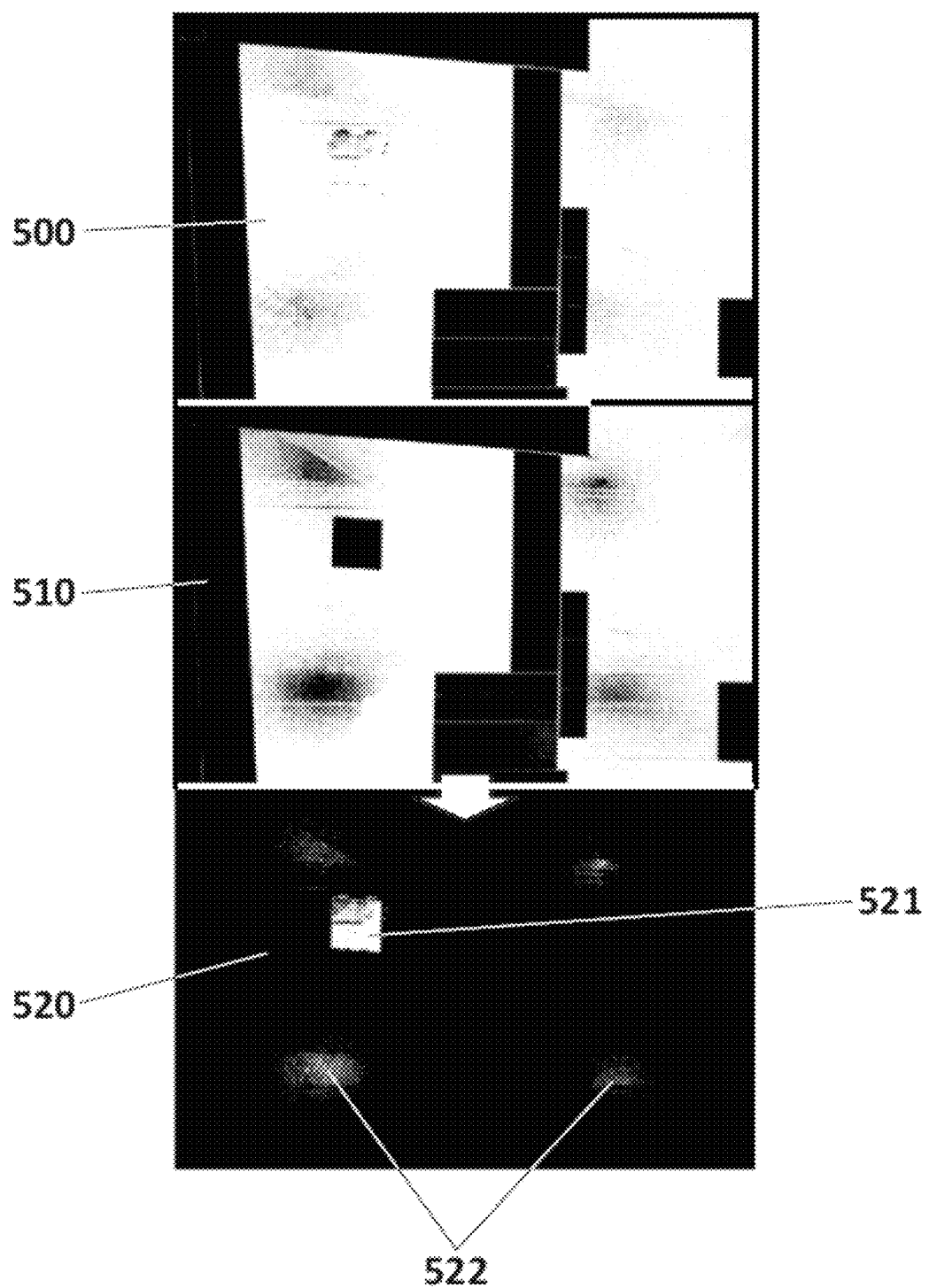
FIG. 5 shows a visualization of anomalies detected in the images captured on the surface to be inspected, according to a possible example of use of the invention.

In one possible use of the system 100, the human-machine interface module 130 may display results as shown in the example of FIG. 5, where an image 500 of an area of the surface 300 under inspection appears; next, the theoretically corrected image 510 that the system 100 obtains from the previous one; and, finally, the resulting image 520 shows the anomalies detected by visually distinguishing the missing pattern or lack of material 521, on the one hand, and on the other, the noise 522 by the lightning spots.

The systems and devices described herein may include a controller, control unit, controlling means, system control, processor or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system to detect anomalies in an automatic placement of composite materials during a manufacturing of structural elements, comprising the following modules:
    an image capture module that can be integrated into an automatic placement machine for composite materials and comprising at least one camera configured to capture images of a surface to be inspected during the manufacture of a structural element comprising the surface, the image capture module being configured to extract data from the images captured by the at least one camera;
    an artificial vision module configured to receive the data extracted by the image capture module and to obtain, by means of a computer vision algorithm using the extracted data, information on anomalies detected on the surface; and
    a human-machine interface module configured to receive the information of detected anomalies obtained by the artificial vision module and automatically translate the information received into a language understandable to humans;
    wherein the artificial vision module is further configured to
    identify, using a labeling algorithm for identifying cluster areas, all the areas that the computer vision algorithm detects as anomalies,
    calculate a porosity parameter from a total area value of each cluster area and a Euler number, and
    compare a given minimum size of areas to be inspected together with the calculated porosity parameter, rule out false positives in the detection of anomalies by the computer vision algorithm.

2. The system according to claim 1, wherein the camera is incorporated in a moving part of the automatic placement machine for composite materials.

3. The system according to claim 2, wherein the camera is incorporated into a head for automatic placement for composite materials configured to move in a plane above the surface to be inspected.

4. The system according to claim 1, wherein the image capture module is further configured to:
- obtain, through a control unit associated with the automatic placement machine for composite materials, a selected numerical control program that is configured to perform displacements for the automatic placement machine for composite materials during the manufacturing of an area of the surface;
- locate the area of the surface to be inspected by measuring positions of the machine in the displacement carried out according to the selected numerical control program;
- apply a rotational-translation transformation to the measured positions to obtain a camera position from which to execute an image capture routine over the located area of the surface.

5. The system according to claim 1, wherein the image capture module is further configured to store the data extracted from the images captured by the camera and send the extracted data, stored or in real time, to the artificial vision module.

6. The system according to claim 1, wherein the artificial vision module is configured to activate an automatic inspection execution after the automatic placement of composite materials on the surface and even during the manufacturing of the structural element.

7. The system according to claim 1, wherein the artificial vision module is further configured to, based on the data extracted by the image capture module, identify using a machine learning algorithm to classify the structural element to be inspected and obtain information regarding the inspection associated with the identified structural element.

8. The system according to claim 1, wherein the artificial vision module is further configured to perform image pre-processing comprising cleaning and cutting the images captured by the image capture module and image correction comprising converting the preprocessed images into binary images that the computer vision algorithm uses as input images.

9. The system according to claim 1, wherein the computer vision algorithm is configured to compare input images with reference images that are images without anomalies.

10. The system according to claim 1, wherein the human-machine interface module is configured to translate the information on detected anomalies obtained by the artificial vision module into a color code associated with types of anomalies.

11. The system according to claim 1, wherein the human-machine interface module further comprises a storage sub-module configured to generate a record of all the information obtained by the artificial vision module in each automatic inspection carried out.

12. The system according to claim 1, wherein the detected anomaly information comprises an indication of lack of material, excess of material, or misplaced material on the surface.

* * * * *